UNITED STATES PATENT OFFICE.

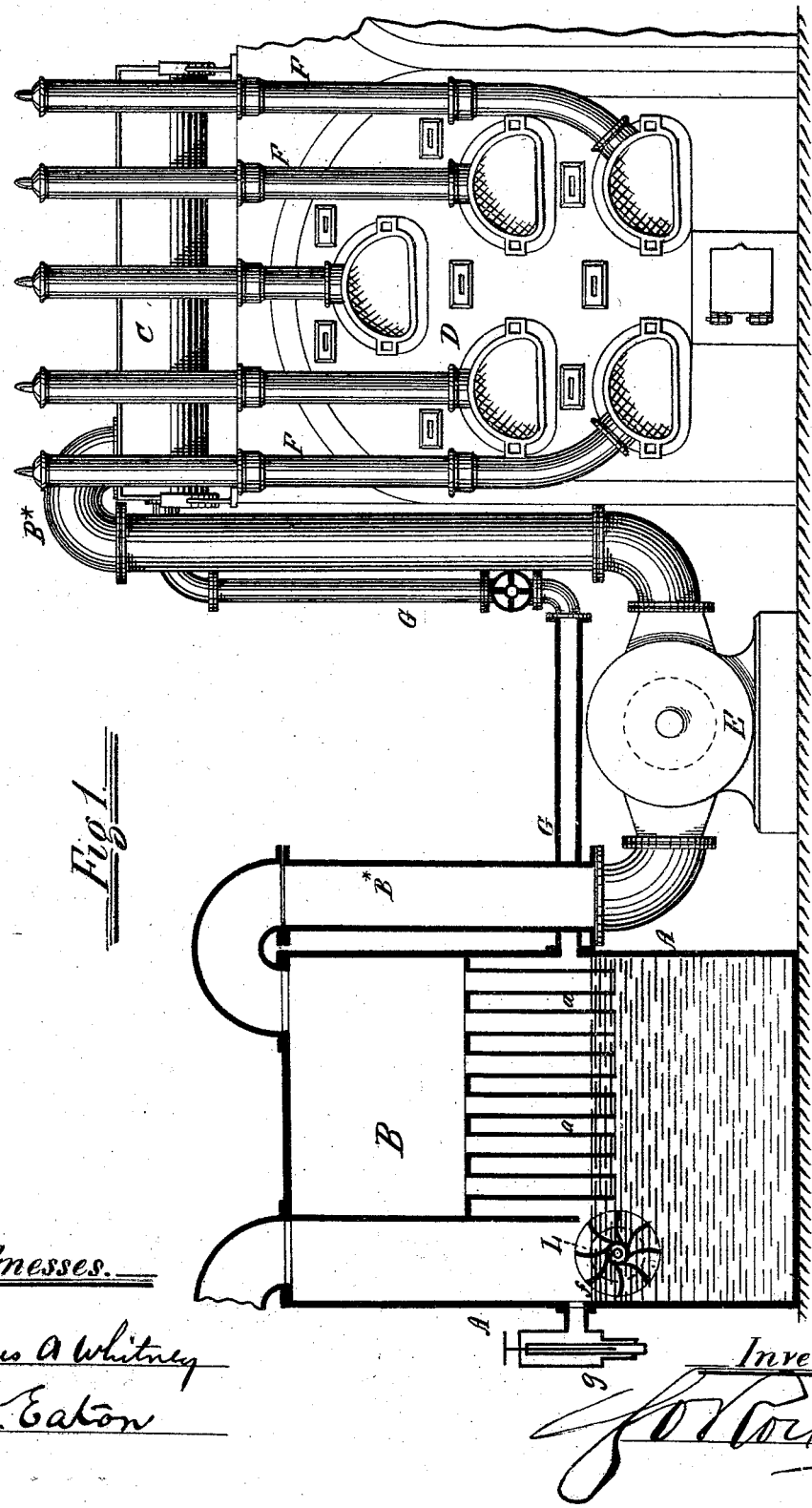

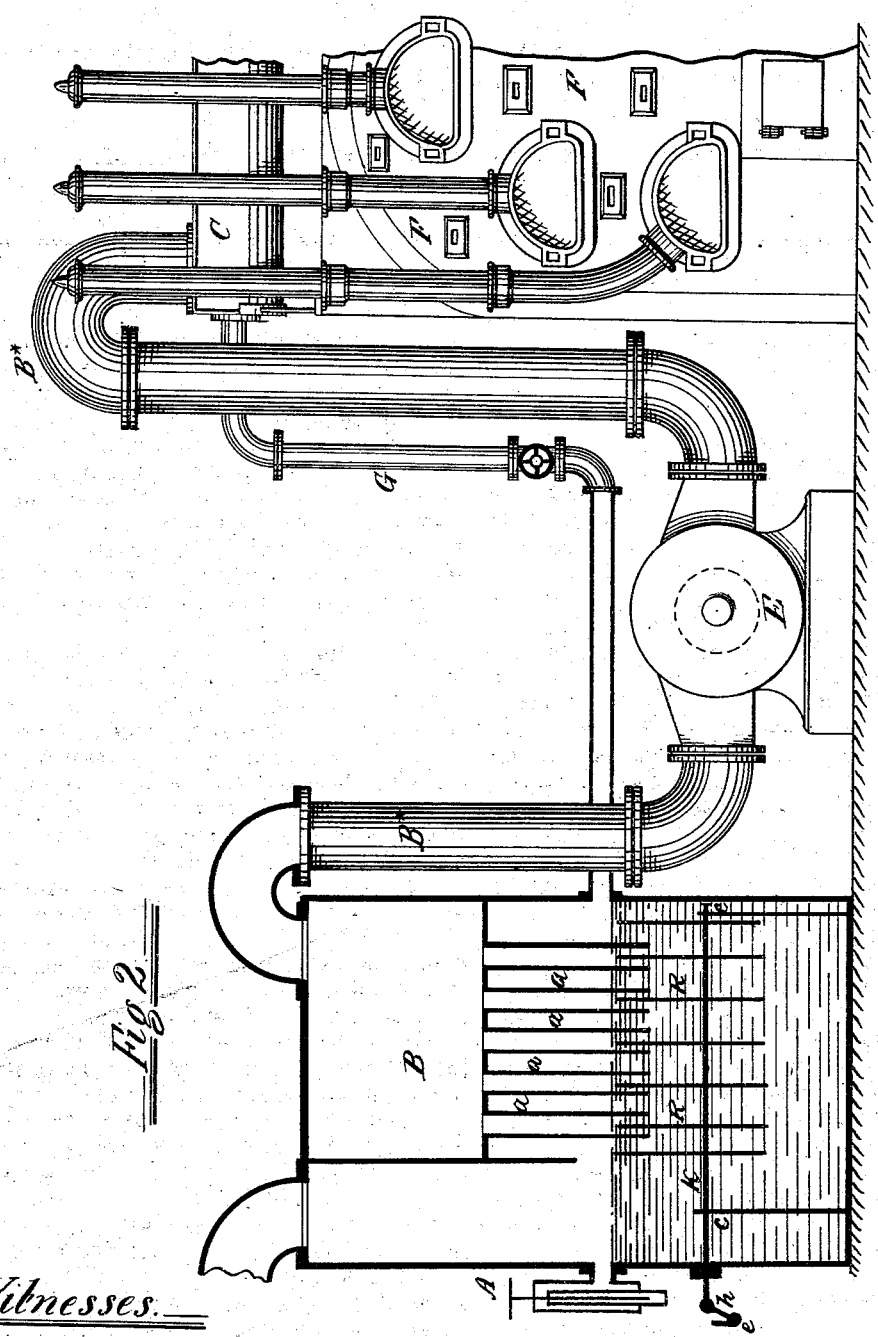

SAMUEL O. ROCKWELL, OF JERSEY CITY, NEW JERSEY, ASSIGNOR TO THE ST. JOHN & ROCKWELL COMPANY, OF NEW YORK, N. Y.

IMPROVEMENT IN PURIFYING ILLUMINATING-GAS.

Specification forming part of Letters Patent No. 154,344, dated August 25, 1874; application filed February 24, 1874.

*To all whom it may concern:*

Be it known that I, SAML. O. ROCKWELL, of Jersey City, in the county of Hudson and State of New Jersey, have invented certain Improvements in Gas-Purifying Apparatus, of which the following is a specification:

This invention relates to the purification of illuminating-gas derived from the destructive distillation of coal-oil, bituminous material, and the like, by subjecting the gas to the chemical action of the liquid products, also produced from such gas-making materials, during distillation, as aforesaid; and the invention consists in the agitation, by mechanical means, of the just-hereinbefore-indicated liquid products, during the passage of the gas therethrough, whereby an intimate contact of the molecules of the gas with those of the liquid, and consequently a very effective purification of the gas, is secured. The invention also comprises the combination of a tank arranged for the transmission through it of the gas to be purified with an agitator or stirrer for carrying into efficient operation the essential feature just first herein specified of this my improvement. The invention further consists in the combination of the aforesaid agitator and tank with one or more dip-tubes, whereby, when desired, the agitator may be used in conjunction with the simple transmission of the gas through or in contact with the liquid to effect the purification of the same.

Figure 1 is a front elevation and partial section of a gas-purifying apparatus made according to my invention, and Fig. 2 is a similar view of a modification of the same.

A is a tank, of rectangular or other suitable form, and furnished with a chamber, B, in its upper part. This chamber connects, by a pipe, B*, with the hydraulic main C, arranged in the usual manner upon the bench or benches of retorts, at D, this pipe being provided with any ordinary or appropriate exhauster, at E. The bottom of the chamber B has depending therefrom any desired number of dip-tubes, a, which open at top into the chamber, and at bottom into the lower or main portion of the tank. The hydraulic main connects with the retorts by dip-pipes F, in the usual way, and from its lower portion, at such part as will insure the depth of liquid in the main to seal the dip-pipes, has a pipe, G, which extends to and connects with that portion of the tank A below the chamber B. The tank should, moreover, have an adjustable outlet-valve, of any suitable or appropriate construction, so arranged as to permit the height of the liquid flowing from the hydraulic main, through the pipe G, to the tank to be regulated in the latter. The liquid products formed or condensed in the hydraulic main flow through the pipe G to the tank, and are allowed to accumulate to a depth sufficient to cover or rise above the lower ends of the dip-tubes $a$ to any extent desired. Extending through the tank, when the apparatus is made and operated as represented in Fig. 1, is a shaft, I, one end of which, through a packed bearing, is extended external to the tank to receive a pulley, (shown in dotted outline at $m$,) rotation being given to the pulley, and consequently to the shaft, by a belt extended to a driving-pulley, of any appropriate kind, actuated by any suitable power. Upon the shaft I, within the tank, is a number of blades, arms, or stirrers, $f$, of curved, half-spiral, or other suitable shape, which by their movement will agitate the liquid.

Motion being given to the agitating devices just set forth, and the exhauster being also put in operation, the exhauster forces the gas into the chamber B, whence it passes through the dip-tubes $a$ into and through the liquid in the lower part of the tank A, the gas passing toward the outlet $g$ of the tank. On its way thither, however, it passes through that portion of the liquid more immediately adjacent to and put in motion by the agitator, as described, and is thereby brought into more intimate and thorough contact with the said liquid, the gas finally passing from the tank to the outlet $g$, and thence to a gasometer, or equivalent receptacle. The molecules, so to speak, of the gas being brought into the most intimate contact with those of the liquid, the chemicals held in solution in the liquid neutralize, and consequently remove, those contained in the gas as it comes from the retorts. At the same time the coal-oils present in minute quantities in the liquid dissolve and retain the naphthaline, which would otherwise be carried over from the tank by the gas; and, furthermore, the particles of tar brought over by the gas from the hydraulic main aggregate in the liquid by cohesion, and are thus separated from the gas without the usual washing with water simply, and consequently without deteriorating the highly-carbonized quality of the gas.

It will be seen that these advantageous results depend directly upon the intimate contact of the gas with the liquid, and that by the means described such contact is very effectively secured.

When preferred, instead of a rotary agitator, one having any other movement suitable for the purpose may be adopted. For example, as shown in Fig. 2, in which K is a horizontal bar having a longitudinal reciprocating movement in guides $c$, and actuated by a crank, $e$, and pitman $b$, or other means, the said bar being provided with wings or blades R, which agitate the liquid as the device is moved to and fro. Moreover, I do not limit myself to the agitator operating with the dip-tubes arranged as described, inasmuch as under some conditions it may be preferred to use the agitator alone, with the gas introduced thereto and to the liquid by other agencies. In such cases the rotary agitator could be formed with a hollow axle, having an internal diameter sufficient to permit the flow of gas therethrough to the tank below the surface of the liquid, and in proper relation to the agitator itself.

What I claim as my invention is—

1. The process herein described for the purification of illuminating-gas, consisting in the mechanical agitation of the liquid derived from the distillation of the gas-producing material during the passage of the gas through the said liquid, substantially as and for the purpose set forth.

2. The combination of an agitator, operating as set forth, with the tank containing the liquid drawn from the hydraulic main, and derived primarily from the distillation of the gas-producing material, substantially as described.

3. The combination of an agitator provided in the tank with one or more dip-tubes, arranged to conduct the gas to and beneath the liquid in the tank, in order that it may pass therethrough, substantially as and for the purpose set forth.

S. O. ROCKWELL.

Witnesses:
JAMES A. WHITNEY,
J. D. EATON.